(12) United States Patent
Kwon

(10) Patent No.: US 8,500,165 B2
(45) Date of Patent: Aug. 6, 2013

(54) PASSENGER AIRBAG APPARATUS

(75) Inventor: Hae Wook Kwon, Yongin-si (KR)

(73) Assignee: Hyundai Mobis Co., Ltd, Yongin-si, Gyeonggi-do (KR)

( * ) Notice: Subject to any disclaimer, the term of this patent is extended or adjusted under 35 U.S.C. 154(b) by 27 days.

(21) Appl. No.: 13/311,635

(22) Filed: Dec. 6, 2011

(65) Prior Publication Data

US 2013/0076012 A1  Mar. 28, 2013

(30) Foreign Application Priority Data

Sep. 23, 2011 (KR) .......................... 10-2011-0096435
Oct. 10, 2011 (KR) .......................... 10-2011-0102990
Oct. 10, 2011 (KR) .......................... 10-2011-0102991
Oct. 10, 2011 (KR) .......................... 10-2011-0103190

(51) Int. Cl.
*B60R 21/16* (2006.01)

(52) U.S. Cl.
USPC ...... 280/743.2; 280/738; 280/739; 280/743.1

(58) Field of Classification Search
USPC ............................ 280/738, 739, 743.1, 743.2
See application file for complete search history.

(56) References Cited

U.S. PATENT DOCUMENTS

| | | | |
|---|---|---|---|
| 8,020,890 B2* | 9/2011 | Webber | 280/739 |
| 8,191,925 B2* | 6/2012 | Williams | 280/739 |
| 8,262,130 B2* | 9/2012 | Fischer et al. | 280/743.2 |
| 8,322,748 B2* | 12/2012 | Abe et al. | 280/739 |
| 2007/0045997 A1* | 3/2007 | Abe et al. | 280/729 |
| 2008/0073891 A1* | 3/2008 | Rose et al. | 280/739 |
| 2008/0073893 A1* | 3/2008 | Schneider | 280/740 |
| 2009/0121460 A1* | 5/2009 | Abe et al. | 280/728.3 |
| 2010/0019476 A1* | 1/2010 | Pausch | 280/742 |
| 2010/0102542 A1* | 4/2010 | Nakajima et al. | 280/743.2 |
| 2011/0121549 A1* | 5/2011 | Parks et al. | 280/741 |
| 2011/0309605 A1* | 12/2011 | Kumagai | 280/741 |

FOREIGN PATENT DOCUMENTS

| | | |
|---|---|---|
| JP | 2005-096495 | 4/2005 |
| KR | 10-2008-0073787 A | 8/2008 |

* cited by examiner

*Primary Examiner* — Toan To
(74) *Attorney, Agent, or Firm* — Sherr & Jiang, PLLC

(57) ABSTRACT

Disclosed is a passenger airbag apparatus that can suppress the deployment pressure of an airbag cushion when the airbag cushion and a passenger are excessively close to each other and maintain the deployment pressure of the airbag cushion when the airbag cushion and the passenger keep an appropriate distance from each other.

38 Claims, 19 Drawing Sheets

SECTION B-B

FIG. 8
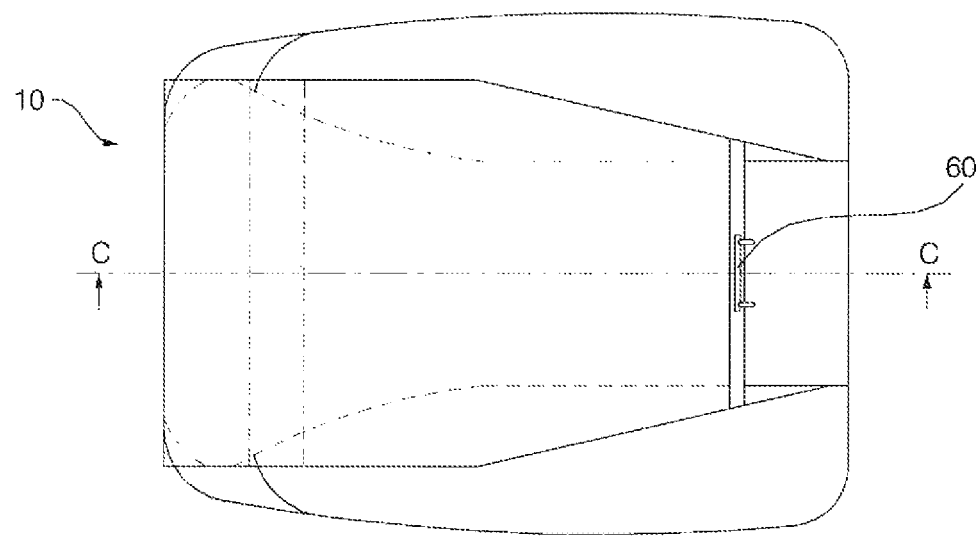
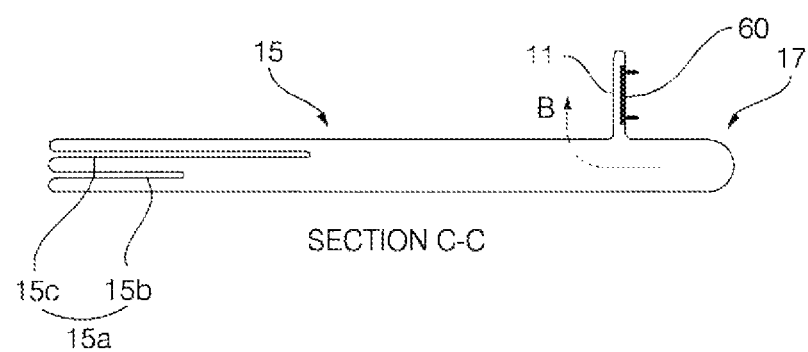
SECTION C-C

FIG. 9
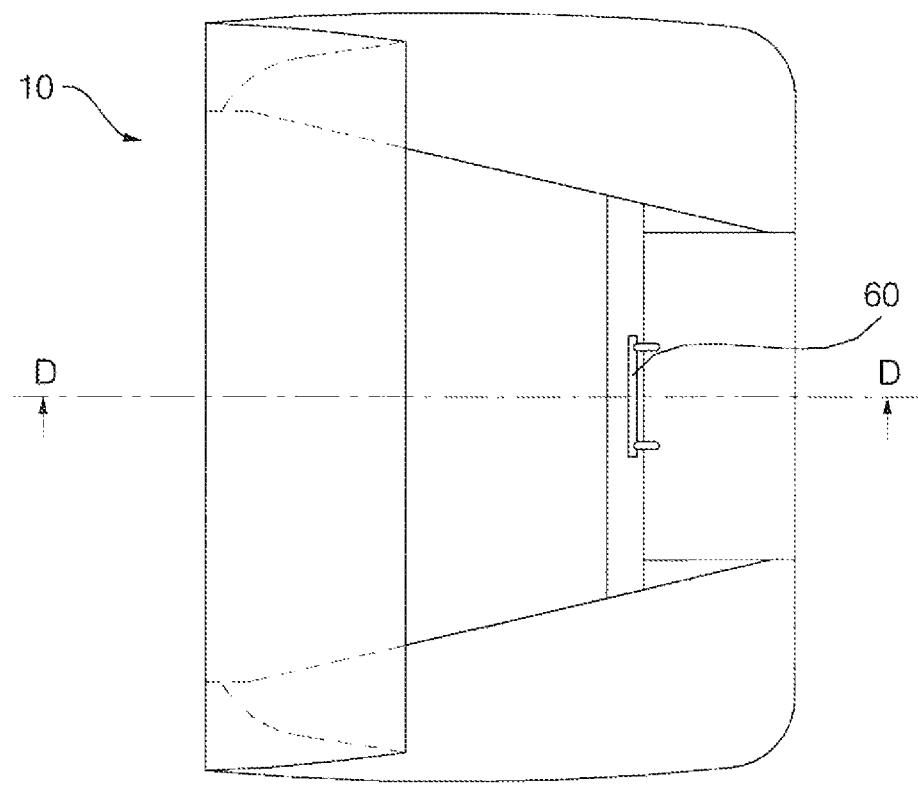
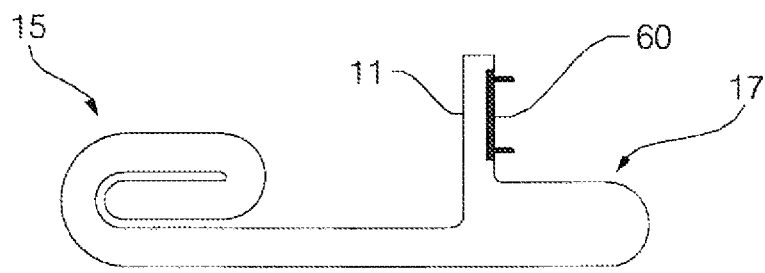
SECTION D-D

SECTION E-E

SECTION F-F

SECTION G-G

PASSENGER AIRBAG APPARATUS

CROSS-REFERENCE TO RELATED APPLICATIONS

The present application claims priority to Korean Patent Application Number 10-2011-0096435 filed Sep. 23, 2011, 10-2011-0102990 filed Oct. 10, 2011, 10-2011-0102991 filed Oct. 10, 2011 and 10-2011-0103190 filed Oct. 10, 2011 the entire contents of which application is incorporated herein for all purposes by this reference.

TECHNICAL FIELD

The present invention relates to a passenger airbag apparatus, and more particularly, to a passenger airbag apparatus in which a deployment pressure of an airbag cushion varies depending on the position of a passenger.

BACKGROUND

In general, a vehicle is equipped with an airbag apparatus as a safety apparatus in which an airbag cushion is expanded by receiving gas from an inflator to protect a rider at the time of an accident.

The airbag apparatus is installed at each portion of a vehicle as necessary. A driver airbag apparatus mounted on a steering wheel in order to protect a driver who sits on a driver seat, a passenger airbag apparatus mounted at an upper portion of a glove box in order to protect a passenger who sits on a passenger seat, and a curtain airbag apparatus mounted on a roof rail in order to protect the side of the rider, are proposed.

Each of these airbag apparatuses includes an inflator generating gas and an airbag cushion that is expanded and deployed when receiving gas in connection with the inflator to protect the riders.

In recent years, there have been shown airbag apparatuses protecting the passenger at an appropriate deployment pressure by changing the deployment pressure of the airbag cushion depending on the position of the passenger.

In particular, the amount of gas discharged from the airbag cushion is controlled by the passenger loaded to the airbag cushion, and as a result, active type airbag apparatuses in which the deployment pressure of the airbag cushion varies attract public attention.

SUMMARY

The present invention has been made in an effort to provide a passenger airbag apparatus that can suppress the deployment pressure of an airbag cushion when the airbag cushion and a passenger are excessively close to each other and maintain the deployment pressure of the airbag cushion when the airbag cushion and the passenger keep an appropriate distance from each other.

The objects of the present invention are not limited to the object described above, and the other objects not stated in the above will be clearly understood by those skilled in the art from the following description.

An exemplary embodiment of the present invention provides a passenger airbag apparatus, including: an airbag cushion expanded by receiving gas; a vent tube placed in an outer part of the airbag cushion, through which the gas received into the airbag cushion is discharged; a guide panel placed to correspond to the vent tube in the airbag cushion; and a tether fastening and closing the vent tube as the airbag cushion is expanded by penetrating the guide panel.

Another exemplary embodiment of the present invention provides a passenger airbag apparatus, including: an airbag cushion expanded by receiving gas; a vent tube placed in an outer part of the airbag cushion, through which the gas received into the airbag cushion is discharged; a guide panel placed to correspond to the vent tube in the airbag cushion; and a tether fastening and closing the vent tube as the airbag cushion is expanded by penetrating the guide panel, in which the tether is placed by surrounding the circumference of the vent tube at plural times.

Yet another exemplary embodiment of the present invention provides a passenger airbag apparatus, including: an airbag cushion expanded by receiving gas; a vent tube placed in an outer part of the airbag cushion, through which the gas received into the airbag cushion is discharged; a guide panel placed to correspond to the vent tube in the airbag cushion; and a tether fastening and closing the vent tube as the airbag cushion is expanded by penetrating the guide panel, in which a shielding unit shielding the vent tube closed by the tether is formed in the vent tube.

The details of other exemplary embodiments are included in the detailed specification and the drawings.

The passenger airbag apparatus according to the exemplary embodiments of the present invention achieves one or more effects described below.

First, since a vent tube is opened or closed depending on expansion restraint of an airbag cushion by a passenger, the passenger can be protected at appropriate deployment pressure by controlling the amount of discharged gas actively according to the position of the passenger.

Second, the vent tube is not inserted into the airbag cushion as the vent tube is caught by a guide panel and the vent tube is closed outside the airbag cushion, and as a result, a deployment shape of the airbag cushion is not changed and the internal volume of the airbag cushion is not changed. Therefore, the airbag cushion can be deployed at design-intended deployment pressure.

Third, when the passenger is positioned at OOP, the vent tube is opened and gas in the airbag cushion is thus discharged through the vent tube. Therefore, the passenger can be prevented from being injured by excessive deployment pressure of the airbag cushion even though the airbag cushion and the passenger are excessively close to each other.

Fourth, when the passenger is positioned at a normal position, the vent tube is closed and the gas in the airbag cushion is not discharged through the vent tube. Therefore, the airbag cushion can protect the passenger positioned at the normal position while maintaining appropriate pressure.

Fifth, by using friction force generated while a tether moves through a through-hole formed on the guide panel, a closed speed of the vent tube can be controlled.

The advantages of the present invention are not limited to the advantages described above, and the other advantages not stated in the above will be clearly understood by those skilled in the art from the following description.

BRIEF DESCRIPTION OF THE DRAWINGS

FIGS. 6 to 12 are plan views and cross-sectional views showing a folding process of the airbag cushion.

DETAILED DESCRIPTION

Figure 1:
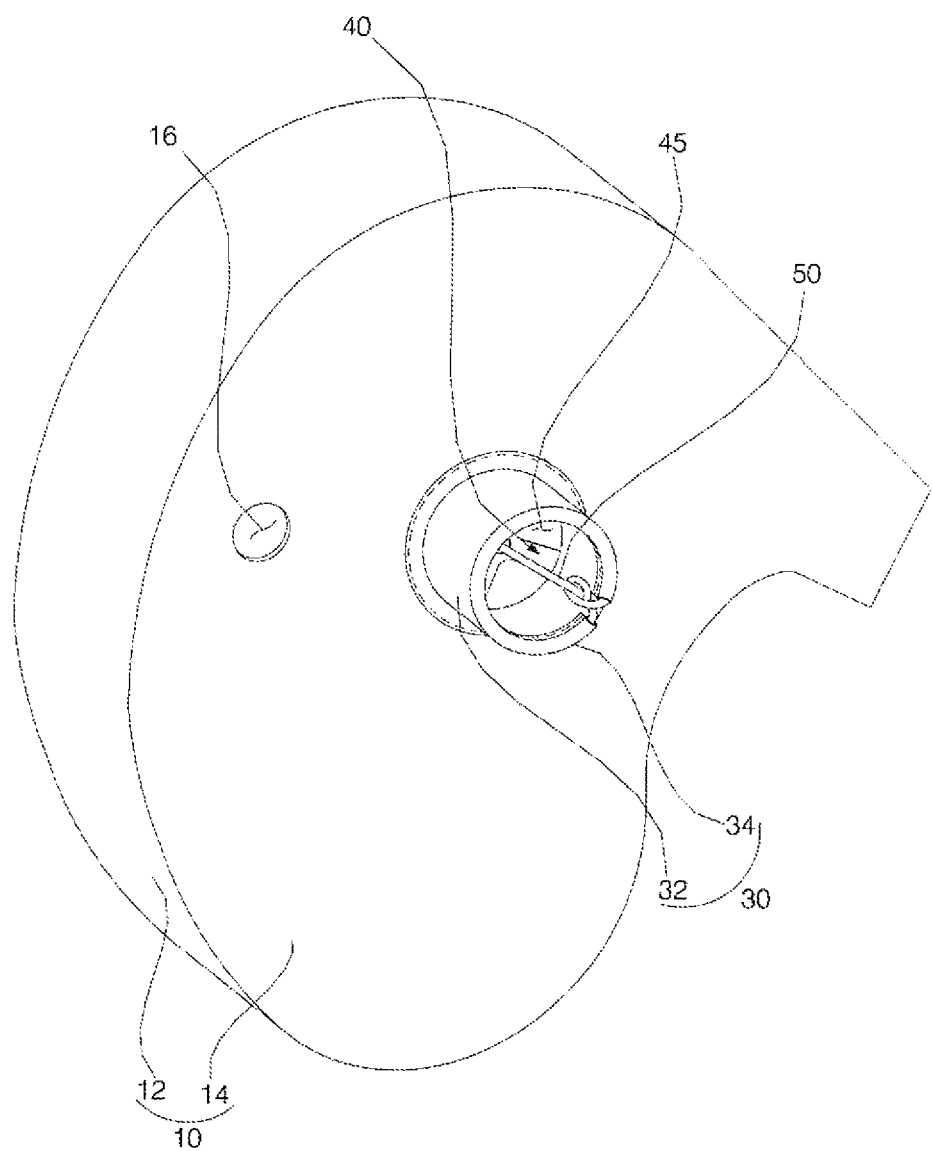
FIG. 1 is a perspective view of a passenger airbag apparatus according to a first exemplary embodiment of the present invention.

Advantages and features of the present invention and methods for achieving them will be made clear from exemplary embodiments described below in detail with reference to the accompanying drawings. However, the present invention is not limited to exemplary embodiments described herein and will be implemented in various forms. The exemplary embodiments are provided by way of example only so that a person of ordinary skill in the art can fully understand the disclosures of the present invention and the scope of the present invention. Therefore, the present invention will be defined only by the scope of the appended claims. Like reference numerals designate like components throughout the specification.

Hereinafter, a passenger airbag apparatus according to exemplary embodiments of the present invention will be described with reference to the accompanying drawings.

Figure 2:
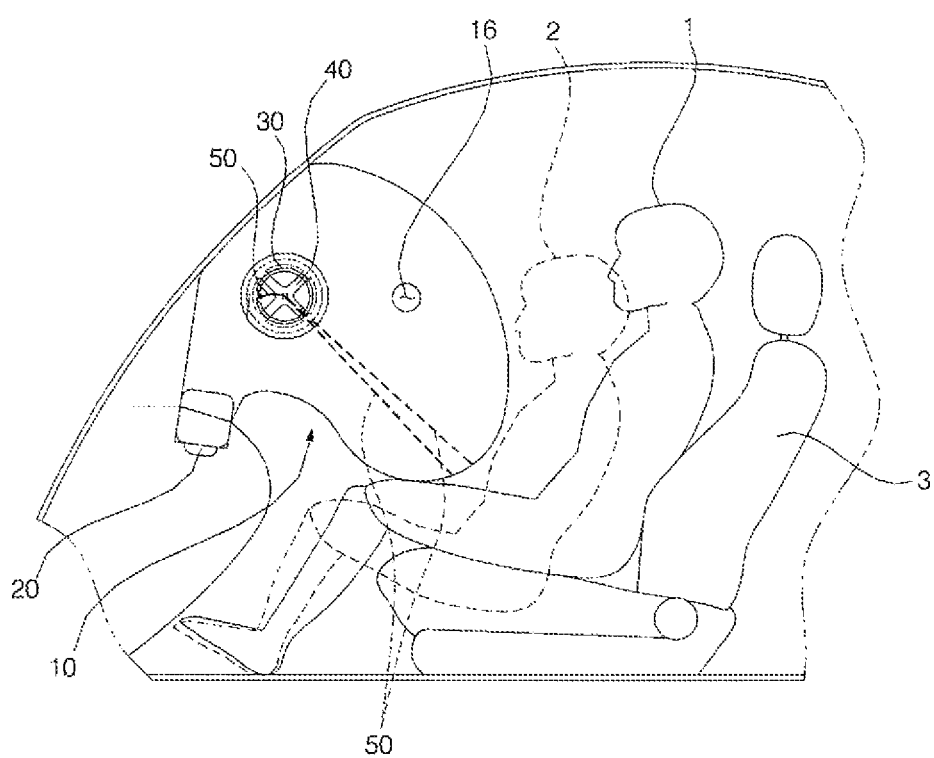
FIG. 2 is a side view of the passenger airbag apparatus according to the first exemplary embodiment of the present invention.
Figure 3:
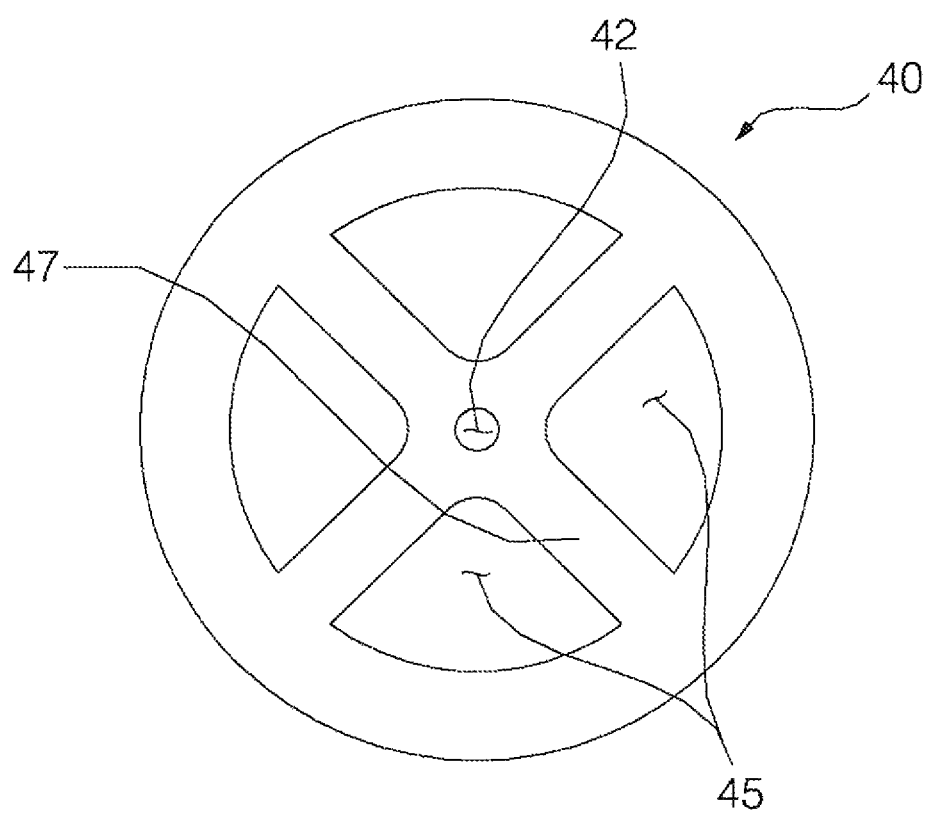
FIG. 3 is a diagram showing a guide panel shown in FIG. 2.

FIG. 1 is a perspective view of a passenger airbag apparatus according to a first exemplary embodiment of the present invention, FIG. 2 is a side view of the passenger airbag apparatus according to the first exemplary embodiment of the present invention, and FIG. 3 is a diagram showing a guide panel 40 shown in FIG. 2.

Referring to FIGS. 1 to 3, a passenger airbag apparatus according to the first exemplary embodiment of the present invention includes an airbag cushion 10 that is expanded and deployed when receiving gas to protect a passenger who sits on a passenger seat 3.

The airbag cushion 10 is manufactured by 3 panels. That is, the airbag cushion 10 includes a main panel 12 that is expanded and deployed to contact the passenger and a side panel 14 coupled to both sides of the main panel 12 through sewing.

When the airbag cushion 10 receives gas generated from an inflator 20 in a vehicle accident in connection with the inflator 20 which is a gas generator, the airbag cushion 10 is expanded and deployed.

However, when the airbag cushion 10 is expanded, in the case where the passenger sits to be inclined to the front of the passenger seat 3 or the passenger sits by pulling the passenger seat 3 to the front, the passenger who sits on the passenger seat 3 and the airbag cushion 10 are excessively close to each other, and as a result, the passenger may be rather injured due to excessive deployment pressure of the airbag cushion 10. In FIG. 2, reference numeral 1 represents a passenger 1 positioned at a normal position, the distance between the airbag cushion 10 and the passenger 1 is an appropriate distance, and the passenger 1 positioned at the normal position can be protected by appropriate deployment pressure of the airbag cushion 10. Reference numeral 2 represents a passenger 2 positioned at out of position (OOP) and represents that the airbag cushion 10 and the passenger 2 are excessively close to each other. The passenger 2 positioned at such a position may be rather injured by the excessive deployment pressure of the airbag cushion 10.

In order to prevent the passenger 2 from being injured due to the excessive deployment pressure of the airbag cushion 10 when the passenger 2 is positioned at OOP, a vent hole 16 through which the gas that flows into the airbag cushion 10 is discharged is formed on the side panel 14, in the airbag cushion 10. However, when the passenger 1 is positioned at the normal position, the excessive large amount of gas is discharged through the vent hole 16 while the airbag cushion 10 is deployed, and as a result, the deployment pressure of the airbag cushion 10 is excessively decreased, such that the passenger 1 at the normal position may not be protected at the appropriate pressure.

Therefore, in the passenger airbag apparatus according to the first exemplary embodiment of the present invention, a vent tube 30, a guide panel 40, and a tether 50 are further placed in the airbag cushion 10 in order to control the amount of discharged amount of the airbag cushion 10 according to the position of the passenger.

The vent tube 30 is coupled to an outer part of the side panel 14 through sewing to discharge the gas that flows into the airbag cushion 10.

The guide panel 40 is placed at a position corresponding to the vent tube 30 in the airbag cushion 10. Guide panel 40 is coupled to an opposite side of the side panel 14 coupled with vent tube 30 through sewing. A communication hole 45 which is in communication with the vent tube 30 is formed in the guide panel 40 and the gas that flows into the airbag cushion 10 is sent to the vent tube 30 through the communication hole 45 to discharge the gas that flows into the airbag cushion 10 through the vent tube 30.

One end of the tether 50 is coupled to the circumference of the vent tube 30 and the other end of the tether 50 is coupled with the main panel 12 of the airbag cushion 10 by penetrating the guide panel 40. The tether 50 is loosened while the airbag cushion 10 is folded and thereafter, when the airbag cushion 10 is expanded by the gas that flows into the airbag cushion 10, the tether 50 is tightened by moving along the airbag cushion 10. Therefore, as the airbag cushion 10 is expanded, the tether 50 is tightened to pull the vent tube 30, and as a result, the vent tube 30 is fastened and closed by the tether 50. Accordingly, in the airbag cushion 10, the gas is not discharged through the vent tube 30 but the gas is discharged through only the vent hole 16. A ring is formed at one end of the tether 50 so that the tether 50 is tightened to fasten the vent tube 30 and the other end of the tether 50 gets out through the ring and penetrates the guide panel 40 and thereafter, may be coupled to the airbag cushion 10.

In particular, when the vent tube 30 is fastened by the tether 50, the vent tube 30 is caught by the guide panel 40, such that the vent tube is not inserted into the airbag cushion 10 but closed outside the airbag cushion 10. Accordingly, as compared with a method in which the vent tube 30 is inserted into the airbag cushion 10 and closed, a deployment shape of the airbag cushion 10 is not changed and the internal volume of the airbag cushion 10 is not changed. Therefore, the airbag cushion 10 can be deployed at design-intended deployment pressure.

The vent tube 30 includes a base portion 32 that protrudes from the airbag cushion 10 and a tether coupled portion 34 formed at the end of the base portion 32. The tether 50 is coupled to the circumference of the tether coupled portion 34 to fasten only the end of vent tube 30. The vent tube 30 has a hollow cylindrical shape to discharge the gas that flows into the airbag cushion 10 and the tether coupled portion 34 is formed by folding the end of the base portion 32 to surround the tether 50 placed on the circumference.

As the airbag cushion 10 is expanded, the tether 50 moves through the guide panel 40 to pull the tether coupled portion 34, and as a result, the tether coupled portion 34 moves toward the guide panel 34. In particular, the tether coupled portion 34 moves in a normal direction with respect to the circumference of the tether coupled portion 34 while the tether coupled portion 34 is pulled by the tether 50 penetrating the guide panel 40, and as a result, the airbag cushion 10 around the vent tube 30 can be prevented from being distorted by the force of the tether 50 which pulls the tether coupled portion 34.

A through-hole 42 penetrated by the tether 50 is formed on the guide panel 40, such that the tether 50 may move through the through-hole 42. In particular, the through-hole 42 is formed at the center of the guide panel 40 to allow the vent tube 30 to be caught by the center of the guide panel 40 while being fastened by the tether 50.

The through-hole 42 has a shape corresponding to the shape of the tether 50. That is, when a cross section of the tether 50 has a circular shape, the through-hole 42 may also have the circular shape and when the cross section of the tether 50 has a rectangular shape, the through-hole 42 may also have the rectangular shape. The tether 50 has a diameter and a thickness larger than the through-hole 42, and as a result, when the tether 50 moves through the through-hole 42 with the expansion of the airbag cushion 10, the tether 50 rubs against the guide panel 40. The closed speed of the vent tube 30 may be controlled by controlling the diameters or thicknesses of the tether 50 and the through-hole 42 so as to control friction force generated when the tether 50 moves through the through-hole 42.

The plurality of communication holes 45 are formed on the guide panel 40 and bridge portions 47 are placed among the plurality of communication holes 45. Therefore, when the vent tube 30 is fastened by the tether 50, the vent tube 30 is caught by the bridge portions 47, such that the vent tube is not inserted into the airbag cushion 10 but closed outside the airbag cushion 10. In the exemplary embodiment, four communication holes 45 and four bridge portions 47 are formed, but the number of the communication holes 45 or the bridges 47 is not limited. For example, two communication holes 45 are formed and one bridge portion 47 may be formed between the two communication holes 45.

The through-hole 42 is formed at the center of the bridge portion 47 where four bridge portions 47 meet each other to allow the vent tube 30 to be caught by the center of the guide panel 40 while the vent tube 30 is fastened by the tether 50 and the tether 50 to rub against the bridge portions 47 while the tether 50 moves through the through-hole 42.

Figure 4:
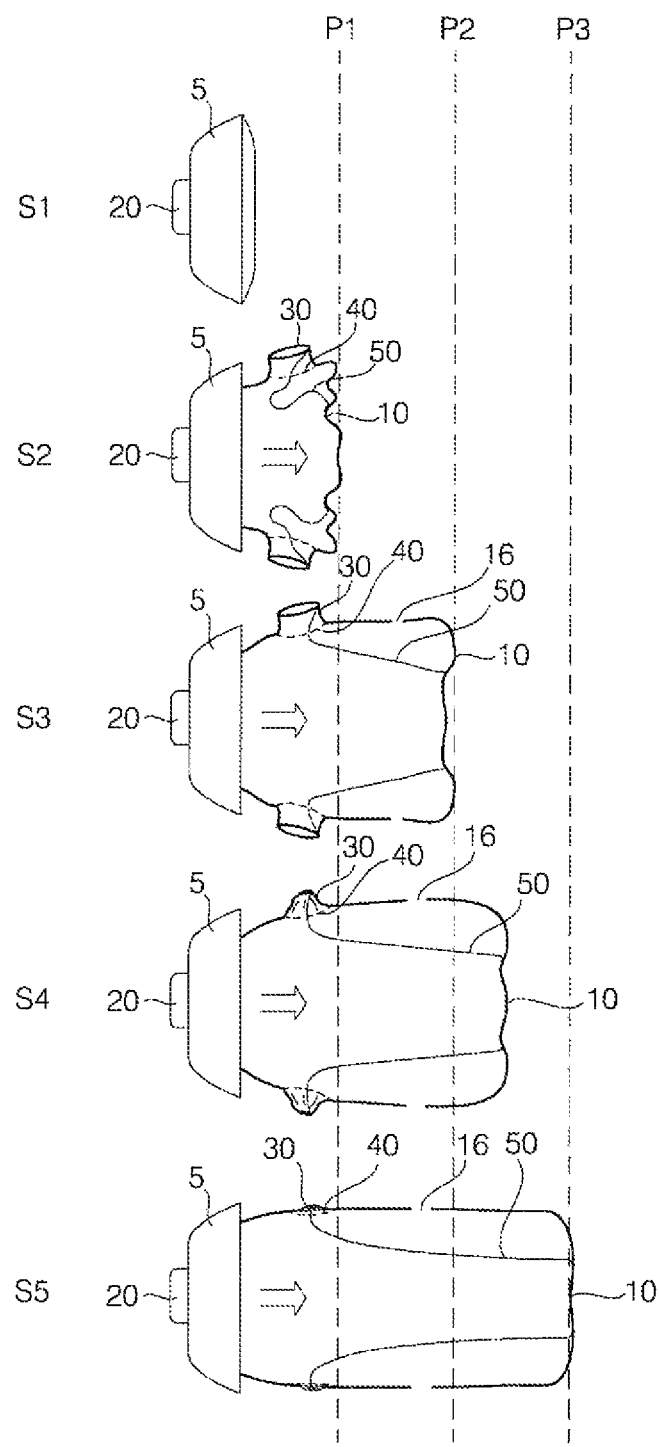
FIG. 4 is a diagram showing an operation according to an expansion size of an airbag cushion of the passenger airbag apparatus according to the first exemplary embodiment.

FIG. 4 is a diagram showing an operation according to an expansion size of the airbag cushion 10 of the passenger airbag apparatus according to the first exemplary embodiment of the present invention.

Referring to FIG. 4, P3 represents the normal position of the passenger. When the passenger is positioned at position P3, the airbag cushion 10 is fully expanded. In this case, the vent tube 30 is fastened and closed by the tether 50 and gas is discharged through only the vent hole 16, such that the airbag cushion 10 maintains the appropriate deployment pressure. The tether 50 is loosened in the airbag cushion 10. When the airbag cushion 10 is expanded, the tether 50 is tightened while moving together with the airbag cushion 10. Thereafter, when the airbag cushion 10 is fully expanded, the tether 50 is formed in a length to close the vent tube 30.

A section of P1 to P2 represents a section that the passenger is positioned at OOP. When the passenger is positioned in the section of P1 to P2, the airbag cushion 10 is restrained by the passenger as an obstacle while the airbag cushion 10 is expanded. In this case, both the vent tube 30 and the vent hole 16 are opened to discharge gas, such that the passenger positioned at OOP is prevented from being injured due to the excessive deployment pressure of the airbag cushion 10.

In a section of P2 to P3, as the airbag cushion 10 is expanded, the vent tube 30 is fastened and closed by the tether 50. Therefore, when expansion is restrained by the passenger as the obstacle in a section of P1 to P3 while the airbag cushion 10 is expanded, the vent tube 30 maintains a minimum opened state.

An expansion procedure of the airbag cushion 10 will be described below.

While the airbag cushion 10 is folded plural times in a flat state, the airbag cushion 10 is connected with the inflator 20 to be received in a housing 5 (S1). In this state, when a vehicle accident occurs, gas is generated from the inflator 20 and the generated gas flows into the airbag cushion 10.

When the gas flows into the airbag cushion 10, the airbag cushion 10 starts being unfolded while being expanded, and as a result, the vent tube 30 is unfolded and opened together (S2).

The airbag cushion 10 is further expanded by continuously receiving the gas and the vent hole 16 is also opened in the section of P1 to P2 which is the OOP section, and as a result, the gas is discharged from the airbag cushion 10 through the vent tube 30 and the vent hole 16 (S3).

When the airbag cushion 10 is further expanded to reach the section of P2 to P3, the tether 50 starts fastening the vent tube 30 while being tightened (S4).

When the airbag cushion 10 is fully expanded to reach P3 which is the normal position of the passenger, the vent tube 30 is fully fastened and closed by the tether 50 and the gas that flows into the airbag cushion 10 is discharged through only the vent hole 16 (S5). In particular, the vent tube 30 receives force to be inserted into the airbag cushion 10 while being fastened by the tether 50, but the vent tube 30 is caught by the guide panel 40 coupled with the inside of the airbag cushion 10, such that the vent tube 30 is not inserted into the airbag cushion 10 but closed outside the airbag cushion 10.

Hereinafter, a folding process of the airbag cushion 10 in order to receive the airbag cushion 10 in the housing 5 will be described.

Figure 5:
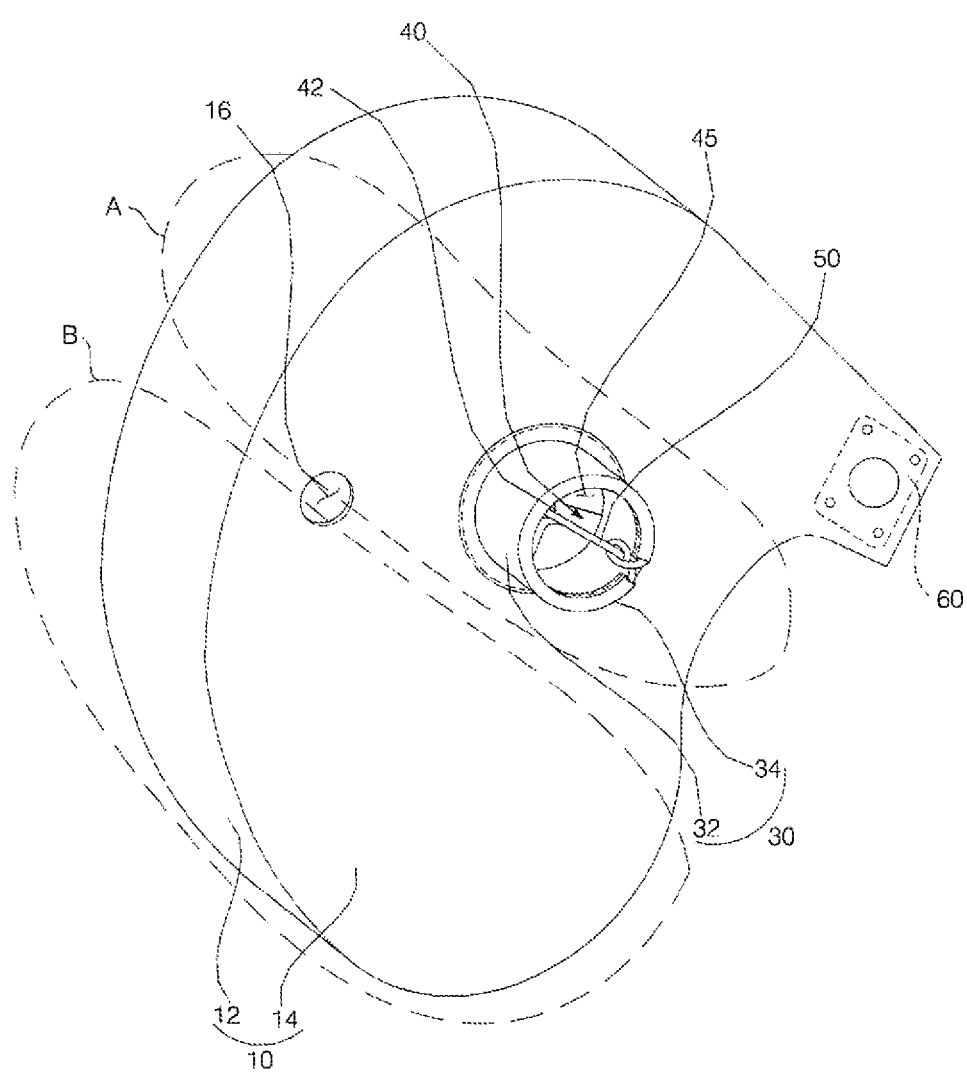
FIG. 5 is a diagram showing the airbag cushion shown in FIG. 1.
Figure 10:
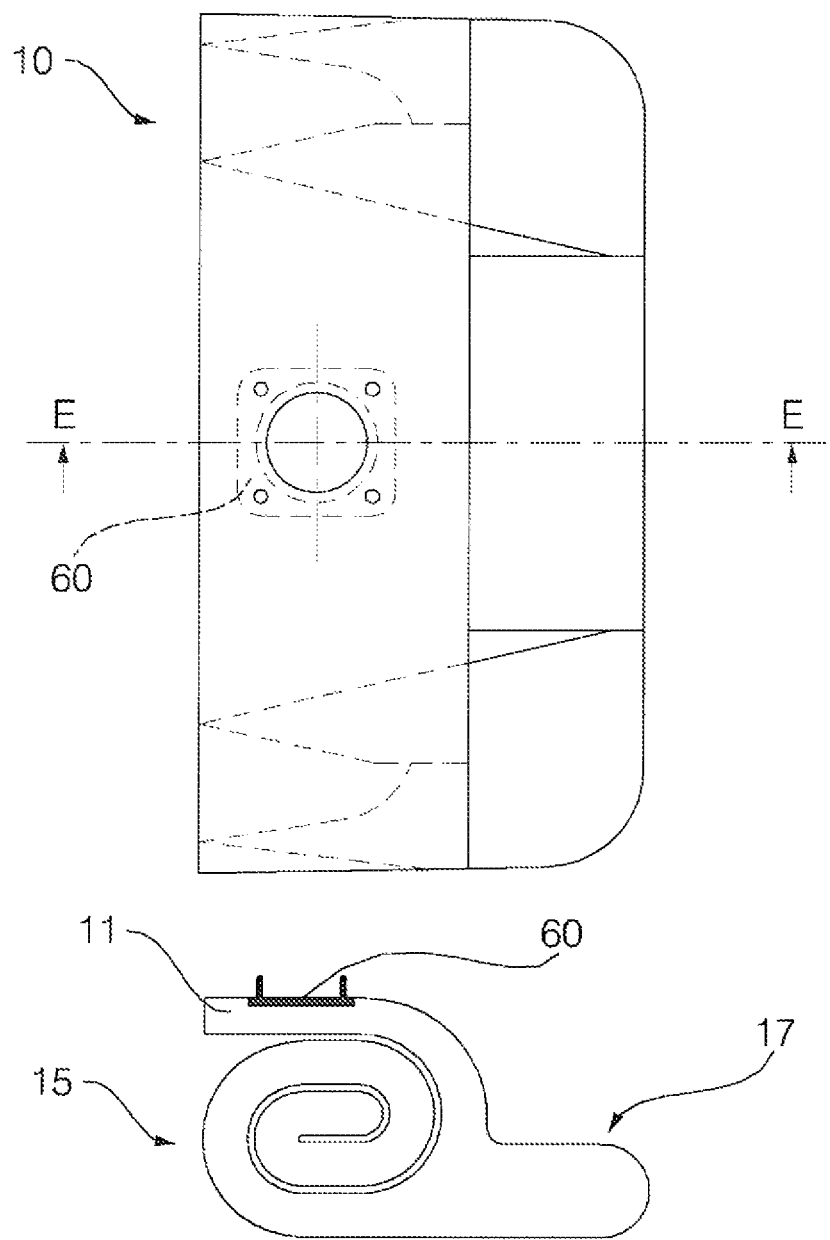
Figure 11:
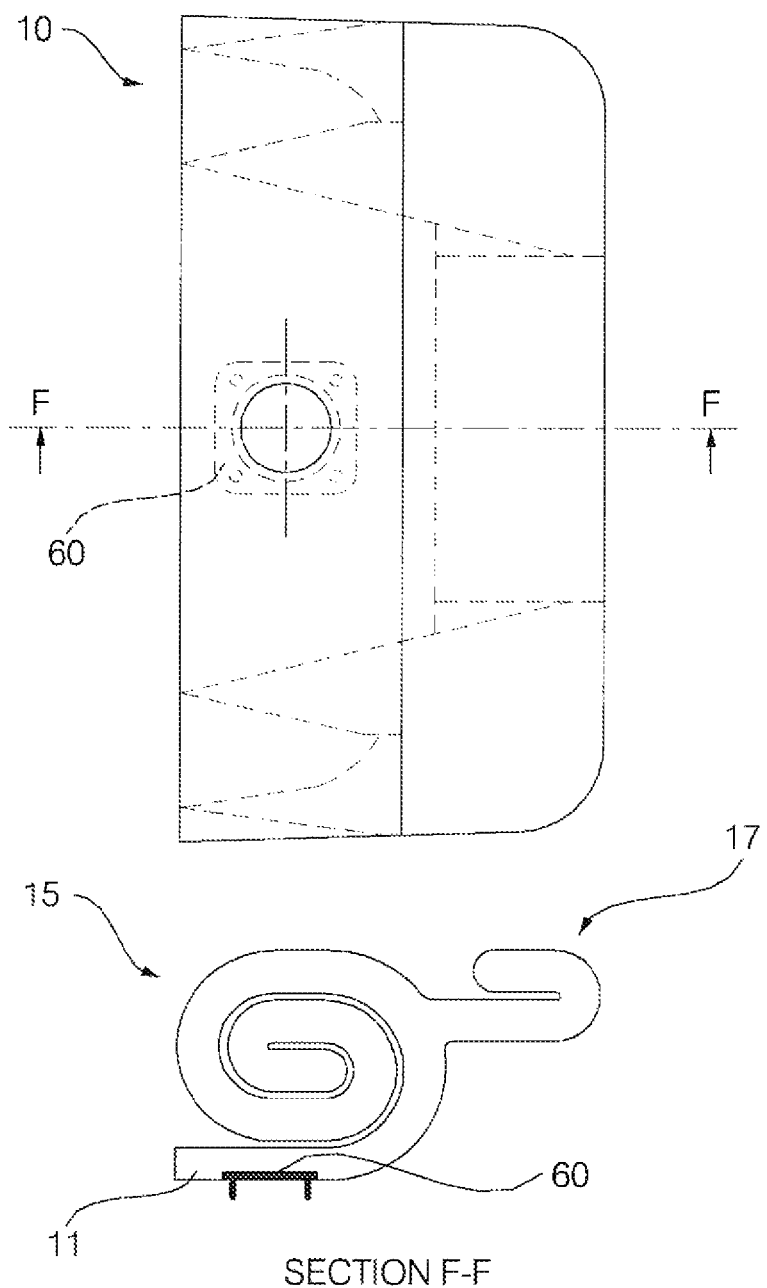
Figure 12:
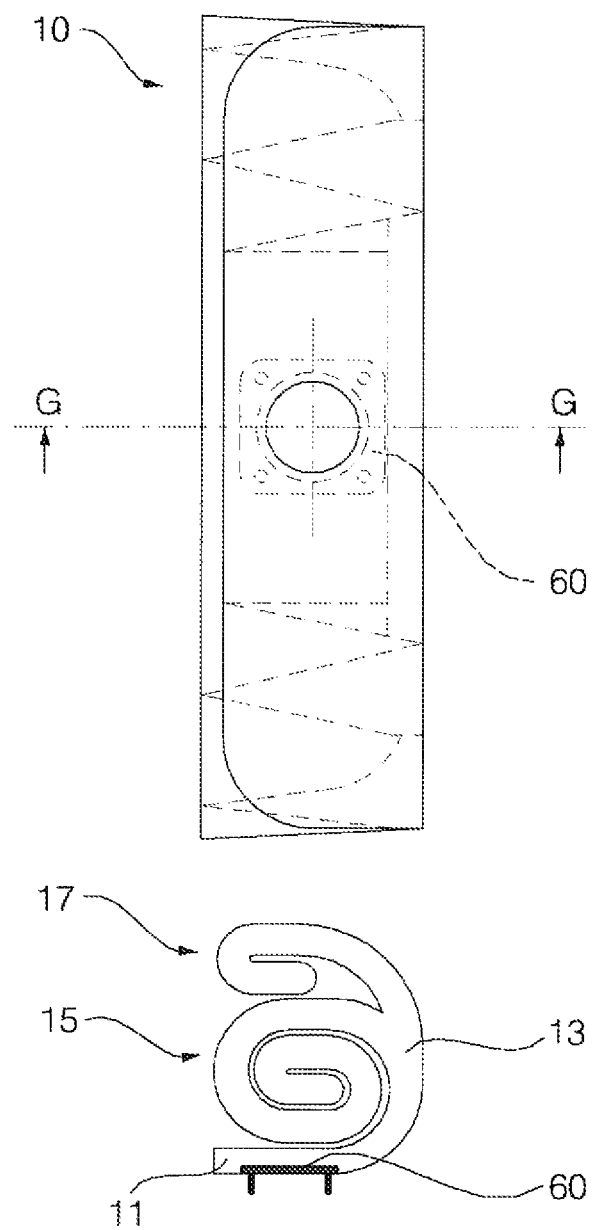
Figure 13:
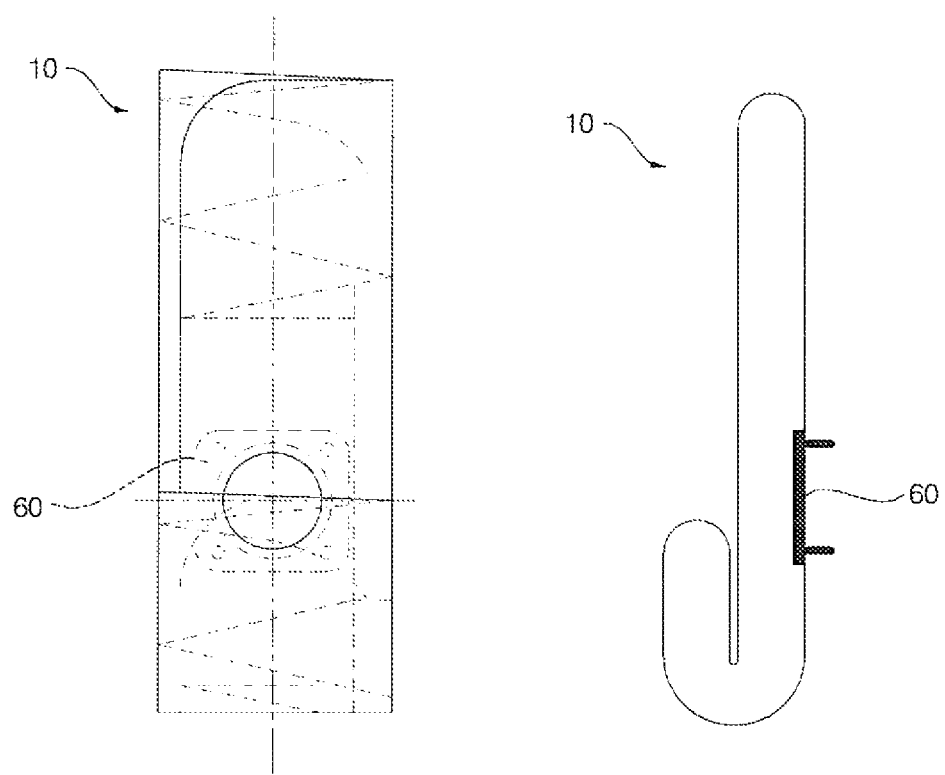
FIGS. 13 and 14 are a plan view and a side view showing the folding process of the airbag cushion after FIG. 12.
Figure 14:
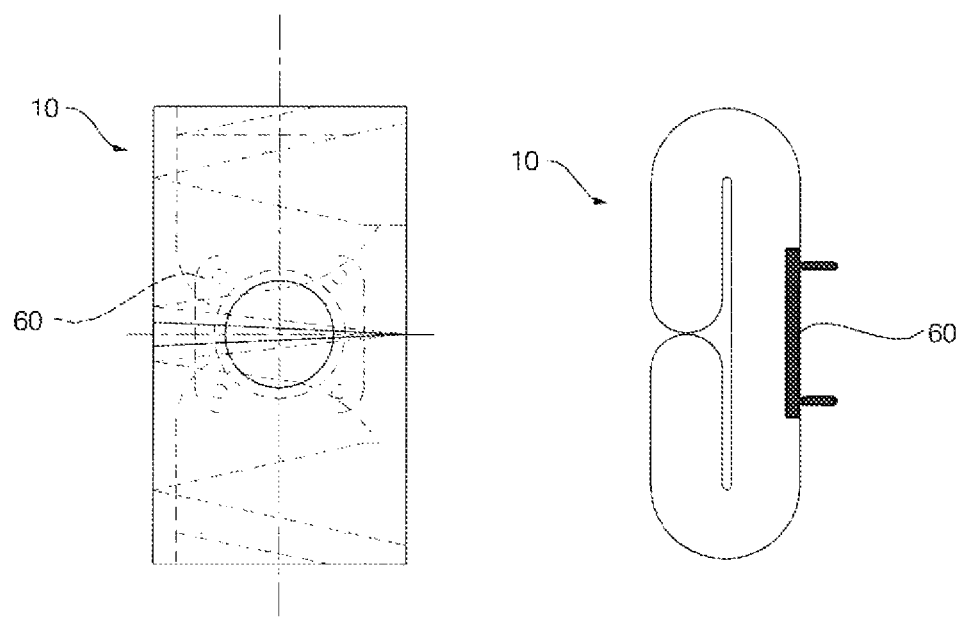

FIG. 5 is a diagram showing the airbag cushion 10 shown in FIG. 1, FIGS. 6 to 12 are plan views and cross-sectional views showing a folding process of the airbag cushion 10, and FIGS. 13 and 14 are a plan view and a side view showing the folding process of the airbag cushion 10 after FIG. 12.

First, referring to FIG. 5, a retainer 60 coupled with the inflator 20 as the gas generator is placed at a rear end portion of the airbag cushion 10.

The airbag cushion 10 includes a region A for protecting a head part of the passenger and a region B for protecting a chest part of the passenger. That is, when the airbag cushion 10 is expanded and deployed when gas is generated from the inflator 20 coupled to the retainer 60, such that the region A for protecting the head part of the passenger is placed to correspond to the head part of the passenger and the region B for protecting the chest part of the passenger is placed to correspond to the chest part of the passenger.

Figure 6:
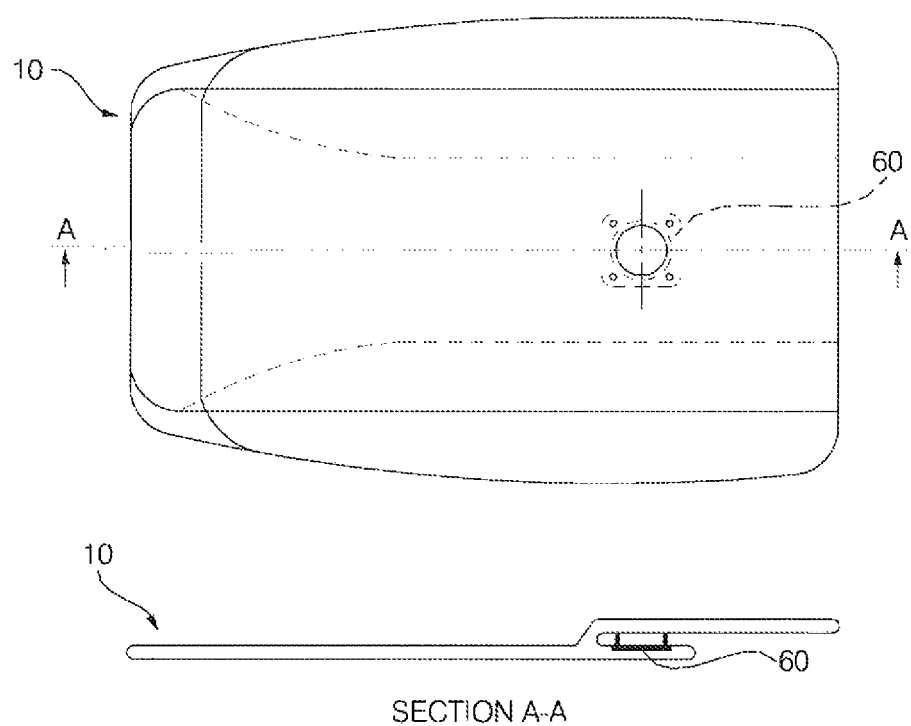

The airbag cushion 10 is positioned in the flat state as shown in FIG. 6, the airbag cushion 10 is folded as shown in FIG. 12, and both sides of the airbag cushion 10 are folded to the center as shown in FIG. 14, and as a result, the folding process of the airbag cushion 10 is completed.

Referring to FIG. 12, the airbag cushion 10 is folded to include a horizontal portion 11, a vertical portion 13, a rolling portion 15, and a wrinkle portion 17.

The horizontal portion 11 is formed horizontally and the retainer 60 is placed in the horizontal portion 11. The vertical portion 13 is extended from the horizontal portion 11 and formed vertically.

The rolling portion 15 is extended and rolled from the end of the vertical portion 13 to be folded up on the horizontal portion 11. In the exemplary embodiment, the rolling portion 15 is folded three times in the same width as the width of the retainer 60 to be folded up on the horizontal portion 11.

The wrinkle portion 17 is extended and folded from the end of the vertical portion 13 to be folded up on the rolling portion 15. In the exemplary embodiment, the wrinkle portion 17 is folded in half to have the same width as the width of the rolling portion 15 to be folded up on the rolling portion 15. Therefore, the horizontal portion 11, the rolling portion 15, and the wrinkle portion 17 have the same width as each other.

The horizontal portion 11, the vertical portion 13, and the wrinkle portion 17 are regions into which the gas generated from the inflator 20 flows initially. When the rolling portion 15 is deployed, the rolling portion 15 is placed to correspond to the head part and the chest part of the passenger to become the region A for protecting the head part of the passenger and the region B for protecting the chest part of the passenger.

Hereinafter, the folding process of the airbag cushion 10 will be described in detail.

First, as shown in FIG. 6, the retainer 60 is placed at an upper side of the airbag cushion 10 and a space above the horizontal portion 11 where the retainer 60 is placed is covered with one side of the airbag cushion 10, such that the airbag cushion 10 and the retainer 60 are substantially flattened. In this case, the airbag cushion 10 is prevented from being overlapped below the retainer 60.

Figure 7:
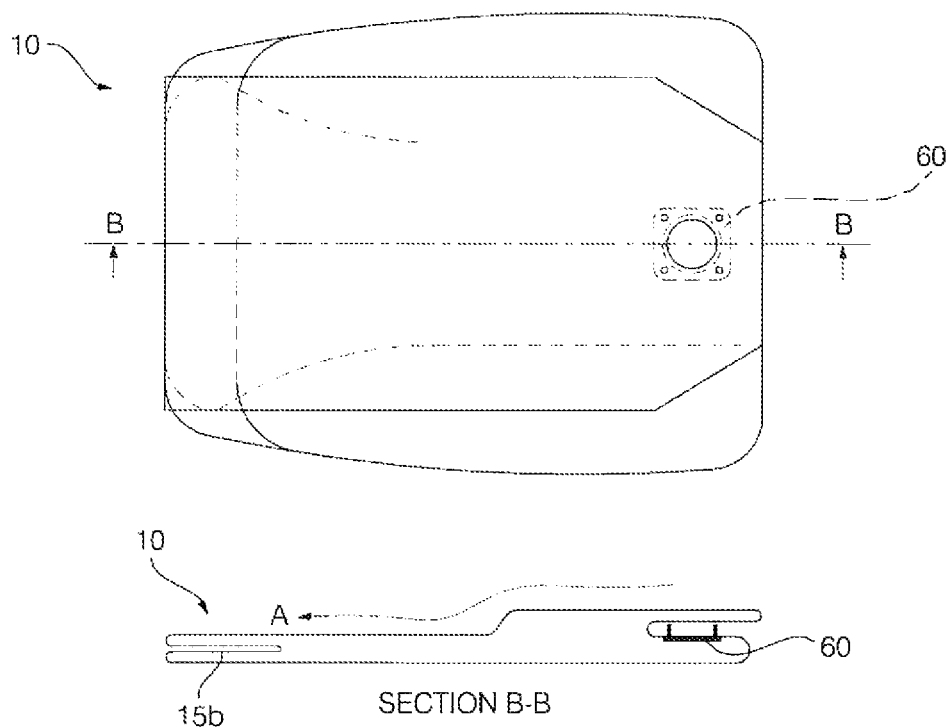

Thereafter, as shown in FIGS. 7 and 8, by pulling one side of the airbag cushion 10 covering the space above the horizontal portion 11 to the other side in the direction of an arrow A, a depression portion 15a into which the end of the one side of the airbag cushion 10 is depressed on the basis of the retainer 60 is formed. In the exemplary embodiment, the depression portion 15a includes a first depression portion 15b and a second depression portion 15c. The second depression portion 15c is depressed longer than the first depression portion 15b and placed above the first depression portion 15b.

Thereafter, the retainer 60 is rotated at 90° in the direction of an arrow B to be erected as shown in FIG. 8. In this case, the airbag cushion 10 is prevented from protruding at a height of 5 mm or more from the top of the erected retainer 60 and the airbag cushion 10 is prevented from being overlapped below the erected retainer 60.

One side around the erected retainer 60 becomes the rolling portion 15. Therefore, in the depression portion 15a, the end of the rolling portion 15 is depressed inside. When the airbag cushion 10 is deployed, the rolling portion 15 is placed to correspond to the head part and the chest part of the passenger. Therefore, when the airbag cushion 10 is deployed, the depression portion 15a is deployed last and the when the airbag cushion 10 is deployed, the depression portion 15a is placed to correspond to the chest part of the passenger.

The other side around the erected retainer 60 becomes the wrinkle portion 17.

Thereafter, as shown in FIGS. 9 to 12, the airbag cushion 10 at one side around the retainer 60 is rolled to form the rolling portion 15 and the rolling portion 15 and the horizontal portion 11 are stacked up and the airbag cushion 10 at the other side around the retainer 60 is folded to form the wrinkle portion 17 and the wrinkle portion 17 and the rolling portion 15 are stacked up.

First, as shown in FIGS. 9 and 10, one side of the airbag cushion 10 around the retainer 60 is rolled three times in the same width as the retainer 60 to form the rolling portion 15 and the erected retainer 60 is inclined over the rolling portion 15 to stack up the horizontal portion 11 on the rolling portion 15.

Thereafter, as shown in FIGS. 11 and 12, the airbag cushion 10 is turned over so that the retainer 60 faces the bottom and thereafter, the other side of the airbag cushion 10 around the retainer 60 is folded in half to have the same width as the rolling portion 15 to form the wrinkle portion 17 and the wrinkle portion 17 is stacked up on the rolling portion 15.

As shown in FIGS. 13 and 14, each of the both sides of the airbag cushion 10 is folded up to the center of the retainer 60 to complete the folding process of the airbag cushion 10.

In the case of the folded airbag cushion 10 as described above, the rolling portion 15 is folded in the same width as the retainer 60 to be folded uniformly on the horizontal portion 11 and the wrinkle portion 17 is folded in the same width as the rolling portion 15 to be uniformly folded on the rolling portion 15 to ensure deployment stability of the airbag cushion 10, thereby preventing the passenger from being injured due to the excessive deployment pressure of the airbag cushion 10.

Figure 15:
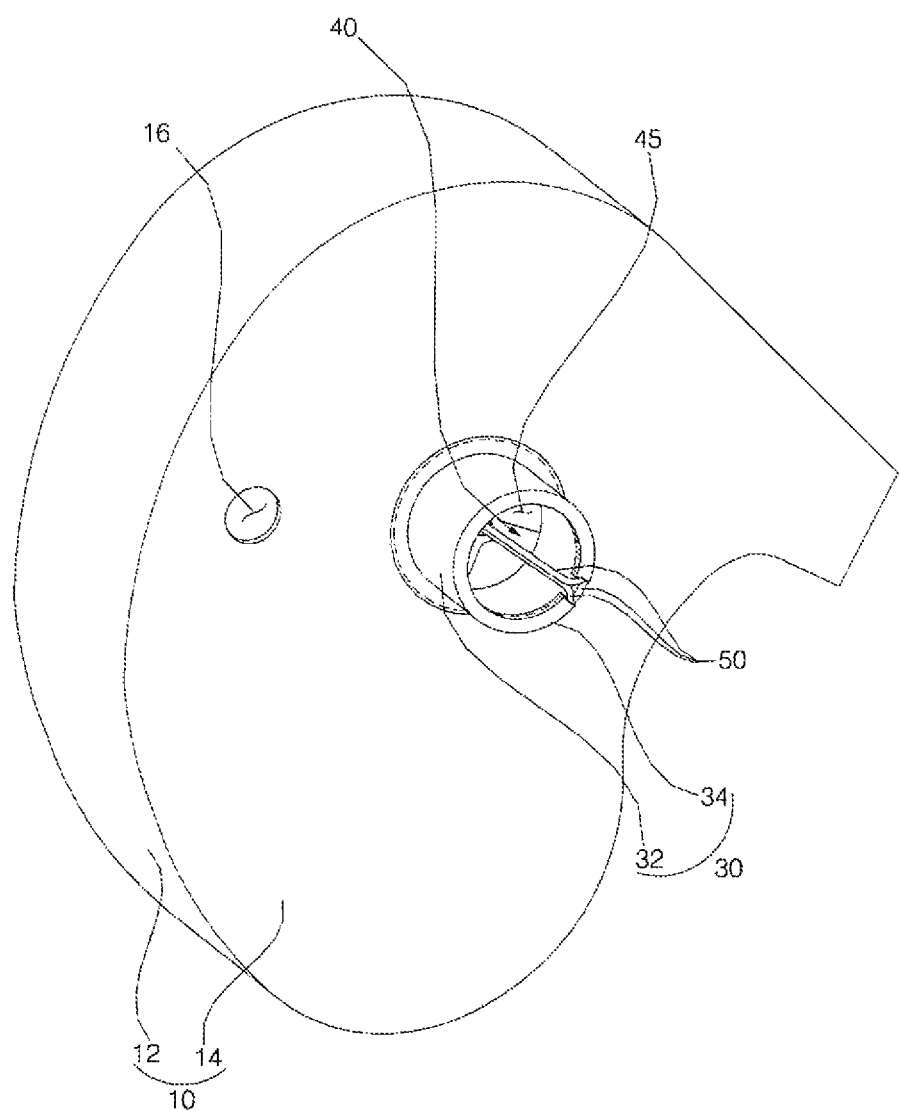
FIG. 15 is a perspective view of a passenger airbag apparatus according to a second exemplary embodiment of the present invention.

FIG. 15 is a perspective view of a passenger airbag apparatus according to a second exemplary embodiment of the present invention. Herein, the same reference numerals refer to the same elements as the above-mentioned exemplary embodiment. Therefore, a detailed description will be omitted and only different points will be described.

Referring to FIG. 15, it can be seen that the passenger airbag apparatus according to the second exemplary embodiment of the present invention is different from that according to the first exemplary embodiment.

That is, the tether 50 is placed to wind the circumference of the vent tube 30 twice. That is, the tether 50 may be placed to wind the circumference of the vent tube 30 twice or more.

Figure 16:
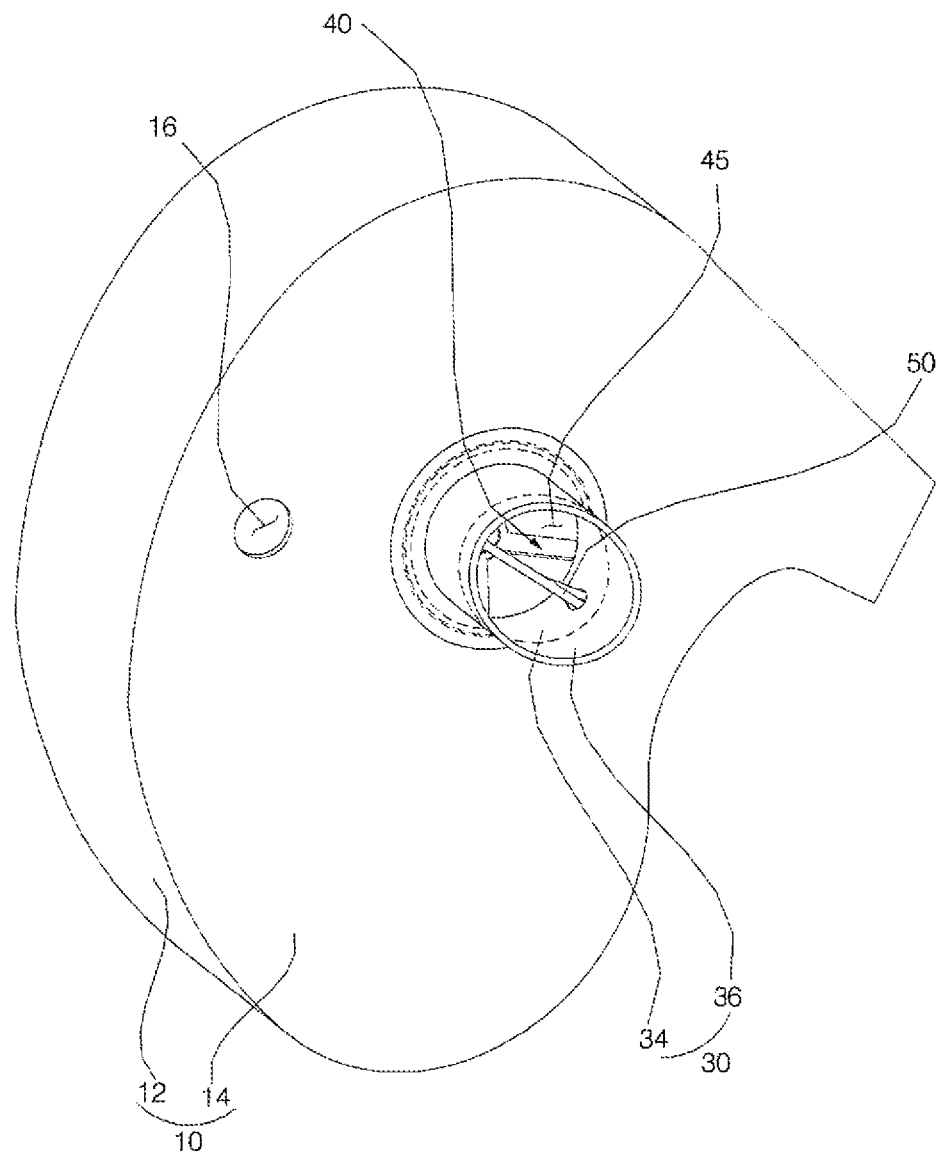
FIG. 16 is a perspective view of a passenger airbag apparatus according to a third exemplary embodiment of the present invention.
Figure 17:
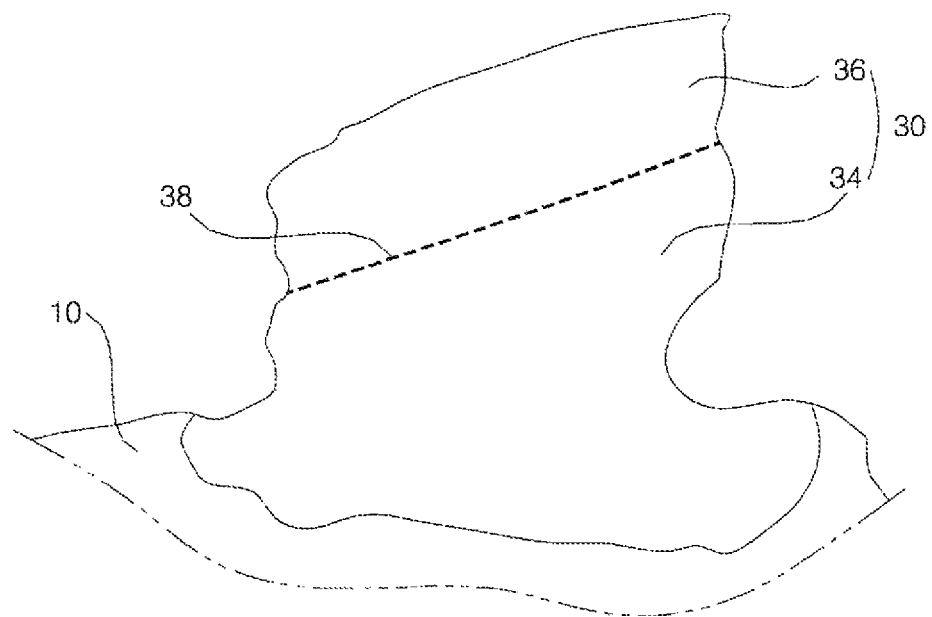
FIG. 17 is a front view of a vent tube shown in FIG. 16.
Figure 18:
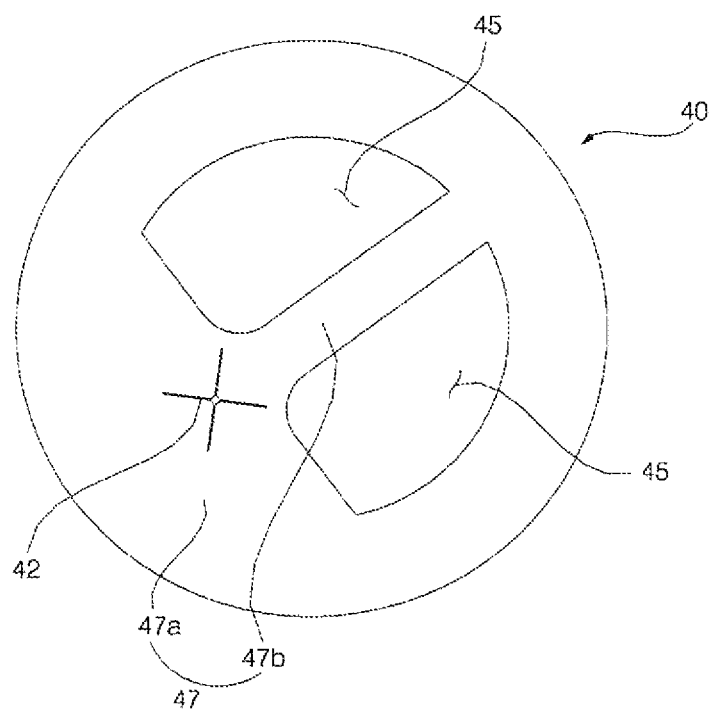
FIG. 18 is a diagram showing a guide panel shown in FIG. 16.

As described above, when the tether 50 winds the circumference of the vent tube 30 plural times, the airbag cushion 10 is expanded and thereafter, the tether 50 is pressed by the passenger to be contracted, and as a result, even though the tether 50 is loosened, the vent tube 30 is not easily opened. Accordingly, the airbag cushion 10 can protect the passenger at the appropriate pressure while maintaining the deployment pressure:

FIG. 16 is a perspective view of a passenger airbag apparatus according to a third exemplary embodiment of the present invention, FIG. 17 is a front view of a vent tube shown in FIG. 16, and FIG. 18 is a diagram showing a guide panel shown in FIG. 16. Herein, the same reference numerals refer to the same elements as the above-mentioned exemplary embodiments. Therefore, a detailed description will be omitted and only different points will be described.

Referring to FIGS. 16 to 18, it can be seen that the passenger airbag apparatus according to the third exemplary embodiment of the present invention is different from those according to the first and second exemplary embodiments.

That is, a shielding unit 36 shielding the vent tube 30 closed by the tether 50 is further formed in the vent tube 30.

The pressure of the gas generated from the inflator 20 is largely influenced by an external temperature condition. For example, when an external temperature is lower than a design-intended temperature, the pressure of the gas generated from the inflator 20 is generated to be lower than a design-intended pressure to flow into the airbag cushion 10, and as a result, the deployment pressure of the airbag cushion 10 is decreased and tension applied to the tether 50 is also decreased. Therefore, the vent tube 30 may not be fully closed.

However, in the exemplary embodiment, since the shielding unit 36 shields the vent tube 30 closed by the tether 50, the shielding unit 36 shields the vent tube 30 even though the vent tube 30 is not fully closed by the tether 50, such that the airbag cushion 10 can protect the passenger 1 at the normal position shown in FIG. 2 while maintaining the appropriate pressure.

The shielding unit 36 is formed at the end of the vent tube 30 and fastened by the tether 50 to shield the closed tether coupled portion 34.

The vent tube 30 protrudes on the side panel 14 of the airbag cushion 10, and as a result, the tether coupled portion 34 protrudes from the airbag cushion 10 and is placed between the airbag cushion 10 and the shielding unit 36. Therefore, when the tether coupled portion 34 is closed, not the end but the center of the vent tube 30 is closed.

The vent tube 30 is partitioned by sewing 38. A portion of the vent tube 30 coupled to the airbag cushion 10 becomes the tether coupled portion 34 and the other portion becomes the shielding unit 36 on the boundary of the sewing 38.

The tether coupled portion 34 is formed to be folded inward while the end of the shielding unit 36 surrounds the tether 50 so that the tether 50 is placed inside.

The end of the vent tube 30 is inclined. Therefore, one portion of the vent tube 30 protrudes from the airbag cushion 10 at a large height. In sewing 38 for partitioning the vent tube 30 into the shielding unit 36 and the tether coupled portion 34, the sewing 38 is inclined to correspond to the end of the vent tube 30, such that the shielding unit 36 is inclined to the guide panel 40 and the end of the tether coupled portion 34 is also inclined to the guide panel 40.

The tether 50 placed in the tether coupled portion 34 gets out through a higher portion of the inclined tether coupled portion 34 and penetrates the guide panel 40. Thereafter, the tether 50 is coupled to the main panel 12 of the airbag cushion 10. Accordingly, as the airbag cushion 10 is expanded, the tether 50 pulls the higher portion of the inclined tether coupled portion 34, and as a result, the tether coupled portion 34 and the shielding unit 36 may be uniformly fastened with the higher portions first shrinking inward and fastened.

The through-hole 42 formed on the guide panel 40 is eccentric on the guide panel 40, such that the inclined vent tube 30 may be caught by the center of the guide panel 30 while being fastened by the tether 50.

The through-hole 42 is formed by cutting the guide panel 40 in a cross pattern so that the tether 50 penetrates the through-hole 42. Therefore, when the tether 50 moves through the through-hole 42, the tether 50 may rub against the guide panel 40. Of course, the through-hole 42 may have the same shape as the tether 50 like the first and second exemplary embodiments. That is, the tether 50 has a diameter and a thickness larger than the through-hole 42, and as a result, when the tether 50 moves through the through-hole 42 with the expansion of the airbag cushion 10, the tether 50 may rub against the guide panel 40.

Each of the communication hole 45 and the bridge portions 47 is formed in two. However, the number of the communication holes 45 or the bridge portions 47 is not limited. For example, four communication holes 45 are formed and four bridge portions 47 may be formed between the four communication holes 45 like the first and second exemplary embodiments.

The through-hole 42 is formed to be eccentric to the bridge portion 47 to allow the inclined vent tube 30 to be caught by the center of the guide panel 40 while being fastened by the tether 50 and the tether 50 to rub against the bridge portion 47 while the tether 50 moves through the through-hole 42.

The bridge portion 47 includes a first bridge portion 47a with the through-hole 42 and a second bridge portion 47b that has a thickness smaller than the first bridge portion 47a and extends from the first bridge portion 47a.

Figure 19:
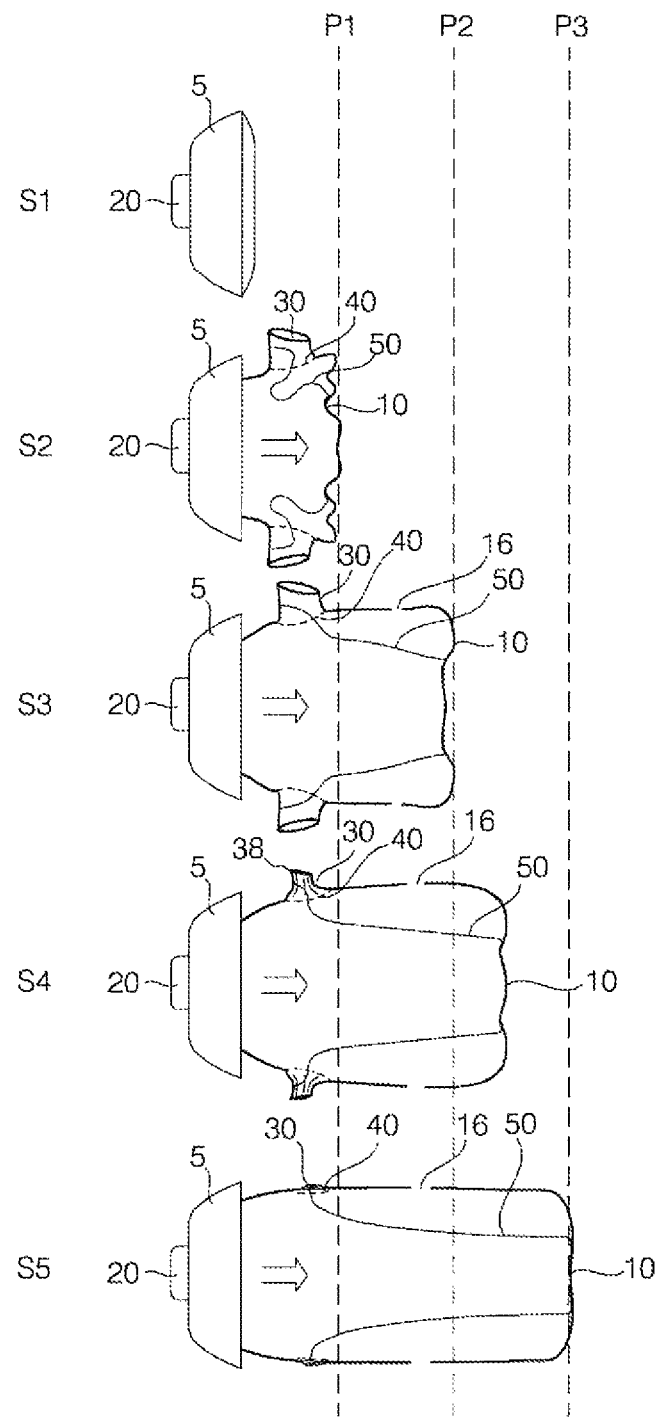
FIG. 19 is a diagram showing an operation according to an expansion size of an airbag cushion of the passenger airbag apparatus according to the third exemplary embodiment of the present invention.

FIG. 19 is a diagram showing an operation according to an expansion size of an airbag cushion of the passenger airbag apparatus according to the third exemplary embodiment of the present invention.

Referring to FIG. 19, while the airbag cushion 10 is folded plural times in the flat state, the airbag cushion 10 is connected with the inflator 20 to be received in the housing 5 (S1). In this state, when the vehicle accident occurs, gas is generated from the inflator 20 and the generated gas flows into the airbag cushion 10.

When the gas flows into the airbag cushion 10, the airbag cushion 10 starts being unfolded while being expanded, and as a result, the vent tube 30 is also unfolded and opened together (S2).

The airbag cushion 10 is further expanded by continuously receiving the gas and the vent hole 16 is also opened in the section of P1 to P2 which is the OOP section, and as a result, the gas is discharged from the airbag cushion 10 through the vent tube 30 and the vent hole 16 (S3).

When the airbag cushion 10 is further expanded to reach the section of P2 to P3, the tether 50 starts fastening the vent tube 30 while being tightened (S4). In this case, the center of the vent tube 30 which is the tether coupled portion 34 is tightened. Therefore, even though the tether coupled portion 34 is not fully shielded by being fastened by the tether 50, the shielding unit 38 may shield the vent tube 30.

When the airbag cushion 10 is fully expanded to reach P3 which is the normal position of the passenger, the tether coupled portion 34 is fully fastened and closed by the tether 50 and the shielding unit 36 shields the closed tether coupled portion 34, such that the gas that flows into the airbag cushion 10 is discharged through only the vent hole 16 (S5). In particular, the vent tube 30 receives force to be inserted into the airbag cushion 10 while being fastened by the tether 50, but the vent tube 30 is caught by the guide panel 40 coupled with the inside of the airbag cushion 10, such that the vent tube 30 is not inserted into the airbag cushion 10 but closed outside the airbag cushion 10.

As described above, in the passenger airbag apparatus according to the exemplary embodiments of the present invention, since the vent tube 30 is opened or closed depending on the expansion restraint of the airbag cushion 10 by the passenger, the passenger can be protected at the appropriate deployment pressure by actively controlling the amount of discharged gas according to the position of the passenger.

Since the vent tube 30 is caught by the guide panel 30 and thus, the vent tube 30 is not inserted into the airbag cushion 10 but closed outside the airbag cushion 10, the deployment shape of the airbag cushion 10 is not changed and the internal volume of the airbag cushion 10 is not changed, and as a result, the airbag cushion 10 may be deployed at the design-intended deployment pressure.

When the passenger is positioned at OOP, the vent tube 30 is opened to discharge the gas in the airbag cushion 10 through the vent tube 30. Therefore, even though the airbag cushion 10 and the passenger are excessively close to each other, the passenger can be prevented from being injured due to the excessive deployment pressure of the airbag cushion 10.

When the passenger is positioned at the normal position, the vent tube is closed and the gas in the airbag cushion is not discharged through the vent tube 30. Therefore, the airbag cushion can protect the passenger positioned at the normal position while maintaining the appropriate pressure.

By using friction force generated while the tether 50 moves through the through-hole 42 of the guide panel 40, a closed speed of the vent tube 30 can be controlled.

It will be understood to those skilled in the art that the present invention may be implemented in various ways without changing the spirit of necessary features of the present invention. Accordingly, the exemplary embodiments described above are provided as examples in the whole respects and do not limit the present invention. The scope of the present invention is defined in the following claims and all changed or modified types derived from the meanings and scope of the claims and the equivalent concept thereof should be construed as being included in the scope of the present invention.

What is claimed is:

1. A passenger airbag apparatus, comprising:
   an airbag cushion expanded by receiving gas;
   a vent tube placed in an outer part of the airbag cushion, through which the gas received into the airbag cushion is discharged;
   a guide panel placed to correspond to the vent tube in the airbag cushion; and
   a tether fastening and closing the vent tube as the airbag cushion is expanded by penetrating the guide panel.

2. The passenger airbag apparatus of claim 1, wherein a communication hole which is in communication with the vent tube is formed on the guide panel.

3. The passenger airbag apparatus of claim 1, wherein one end of the tether is coupled to the circumference of the vent tube and the other end is coupled to the airbag cushion.

4. The passenger airbag apparatus of claim 1, wherein the vent tube includes:
   a base portion that protrudes from the airbag cushion; and
   a tether coupled portion that is formed at the end of the base portion and coupled with the tether on the circumference thereof.

5. The passenger airbag apparatus of claim 4, wherein as the airbag cushion is expanded, the tether coupled portion is pulled by the tether to move in a normal direction with respect to the circumference to the tether coupled portion.

6. The passenger airbag apparatus of claim 1, wherein when the vent tube is fastened by the tether, the vent tube is caught by the guide panel to be closed outside the airbag cushion.

7. The passenger airbag apparatus of claim 1, wherein a through-hole penetrated by the tether is formed on the guide panel.

8. The passenger airbag apparatus of claim 7, wherein as the airbag cushion is expanded, the tether has a diameter or a thickness larger than the through-hole so as to rub against the guide panel.

9. The passenger airbag apparatus of claim 7, wherein the through-hole is formed at the center of the guide panel.

10. The passenger airbag apparatus of claim 2, wherein the plurality of communication holes are formed on the guide panel, and
    the guide panel includes at least one bridge portion placed between the plurality of communication holes.

11. The passenger airbag apparatus of claim 10, wherein when the vent tube is fastened by the tether, the vent tube is caught by the bridge portion to be closed outside the airbag cushion.

12. The passenger airbag apparatus of claim 10, wherein a through-hole penetrated by the tether is formed on the bridge portion.

13. The passenger airbag apparatus of claim 12, wherein as the airbag cushion is expanded, the tether has a diameter or a thickness larger than the through-hole so as to rub against the bridge portion.

14. The passenger airbag apparatus of claim 12, wherein the through-hole is formed at the center of the bridge portion.

15. The passenger airbag apparatus of claim 1, wherein when the airbag cushion is fully expanded, the tether has a length to close the vent tube, and as a result, when the expansion is restrained by an obstacle while the airbag cushion is expanded, the vent tube is opened.

16. The passenger airbag apparatus of claim 1, further comprising a vent hole formed in the airbag cushion, through which the gas received into the airbag cushion is discharged.

17. The passenger airbag apparatus of claim 1, wherein the tether is placed by surrounding the circumference of the vent tube plural times.

18. The passenger airbag apparatus of claim 1, wherein a shielding unit shielding the vent tube closed by the tether is formed in the vent tube.

19. The passenger airbag apparatus of claim 18, wherein a tether coupled portion that is coupled with the tether on the circumference thereof to be fastened and closed by the tether, and shield by the shielding unit is further formed in the vent tube.

20. The passenger airbag apparatus of claim 19, wherein the tether coupled portion protrudes from the airbag cushion and is placed between the airbag cushion and the shielding unit.

21. The passenger airbag apparatus of claim 18, wherein the shielding unit is formed at the end of the vent tube.

22. The passenger airbag apparatus of claim 18, wherein the shielding unit is inclined to the guide panel.

23. The passenger airbag apparatus of claim 19, wherein the shielding unit and the tether coupled portion are inclined to the guide panel.

24. The passenger airbag apparatus of claim 23, wherein as the airbag cushion is expanded, the tether pulls a higher portion of the inclined tether coupled portion.

25. The passenger airbag apparatus of claim 18, wherein a communication hole which is in communication with the vent tube is formed on the guide panel.

26. The passenger airbag apparatus of claim 18, wherein one end of the tether is coupled to the circumference of the vent tube and the other end is coupled to the airbag cushion.

27. The passenger airbag apparatus of claim 18, wherein when the vent tube is fastened by the tether, the vent tube is caught by the guide panel to be closed outside the airbag cushion.

28. The passenger airbag apparatus of claim 18, wherein a through-hole penetrated by the tether is formed on the guide panel.

29. The passenger airbag apparatus of claim 28, wherein as the airbag cushion is expanded, the tether has a diameter or a thickness larger than the through-hole so as to rub against the guide panel.

30. The passenger airbag apparatus of claim 28, wherein the through-hole is eccentric to the guide panel.

31. The passenger airbag apparatus of claim 25, wherein the plurality of communication holes are formed on the guide panel, and
the guide panel includes at least one bridge portion placed between the plurality of communication holes.

32. The passenger airbag apparatus of claim 31, wherein when the vent tube is fastened by the tether, the vent tube is caught by the bridge portion to be closed outside the airbag cushion.

33. The passenger airbag apparatus of claim 31, wherein a through-hole penetrated by the tether is formed on the bridge portion.

34. The passenger airbag apparatus of claim 33, wherein as the airbag cushion is expanded, the tether has a diameter or a thickness larger than the through-hole so as to rub against the bridge portion.

35. The passenger airbag apparatus of claim 33, wherein the through-hole is eccentric to the bridge portion.

36. The passenger airbag apparatus of claim 35, wherein the bridge portion includes:
a first bridge portion with the through-hole; and
a second bridge portion having a thickness smaller than the first bridge portion and extending from the first bridge portion.

37. The passenger airbag apparatus of claim 18, wherein when the airbag cushion is fully expanded, the tether has a length to close the vent tube, and as a result, when the expansion is restrained by the obstacle while the airbag cushion is expanded, the vent tube is opened.

38. The passenger airbag apparatus of claim 18, further comprising a vent hole formed in the airbag cushion, through which the gas received into the airbag cushion is discharged.

* * * * *